(12) United States Patent
Hou et al.

(10) Patent No.: US 12,523,395 B2
(45) Date of Patent: Jan. 13, 2026

(54) WATER BOILER WITH DUAL HEATING FUNCTIONALITY

(71) Applicant: Xiamen Aquasu Electric Shower Co., Ltd., Xiamen (CN)

(72) Inventors: Quanduo Hou, Xiamen (CN); Yan Zeng, Xiamen (CN)

(73) Assignee: Xiamen Aquasu Electric Shower Co., Ltd., Xiamen (CN)

( * ) Notice: Subject to any disclaimer, the term of this patent is extended or adjusted under 35 U.S.C. 154(b) by 376 days.

(21) Appl. No.: 18/351,976

(22) Filed: Jul. 13, 2023

(65) Prior Publication Data

US 2024/0175607 A1 May 30, 2024

(30) Foreign Application Priority Data

Nov. 25, 2022 (CN) .......................... 202223148581.2

(51) Int. Cl.
*F22B 27/00* (2006.01)
*F24H 1/10* (2022.01)
*F24H 1/18* (2022.01)
*F24H 15/174* (2022.01)
*F24H 15/219* (2022.01)

(52) U.S. Cl.
CPC ............. *F24H 15/174* (2022.01); *F24H 1/10* (2013.01); *F24H 1/18* (2013.01); *F24H 15/219* (2022.01)

(58) Field of Classification Search
CPC ...... F24H 15/174; F24H 1/202; F24H 15/219; F24H 9/133; F24H 1/10; F24H 1/102; F24H 1/18; F24H 1/122; F24H 9/16; F24H 9/1818; F24H 9/2021; F22B 27/00; F22B 35/005
See application file for complete search history.

(56) References Cited

U.S. PATENT DOCUMENTS

| | | | |
|---|---|---|---|
| 9,885,484 B2 * | 2/2018 | Young ..................... | F24D 12/02 |
| 12,117,245 B2 * | 10/2024 | Armstrong .............. | F24D 17/02 |
| 2012/0051724 A1 * | 3/2012 | Abraham ............... | F24H 9/1818 |
| | | | 392/441 |
| 2013/0042635 A1 * | 2/2013 | Nelson .................. | F24H 15/223 |
| | | | 62/238.7 |

FOREIGN PATENT DOCUMENTS

| | | | | |
|---|---|---|---|---|
| CN | 107250685 A | * | 10/2017 | ............... F24H 9/18 |
| GB | 2038460 A | * | 7/1980 | ............. F24H 1/208 |
| GB | 2446601 A | * | 8/2008 | ........... F24H 9/0015 |
| WO | WO-2018230817 A1 | * | 12/2018 | ............. F24H 1/122 |
| WO | WO-2020145454 A1 | * | 7/2020 | ........... F24H 9/2021 |

* cited by examiner

*Primary Examiner* — Gregory A Wilson

(57) ABSTRACT

A water boiler with dual heating functionality includes: a hot water tank having an upper section and a lower section; the upper section is narrower than the lower section; the hot water tank comprises an instantaneous heating portion, and a storage heating section; an instantaneous heating pipe arranged within the instantaneous heating portion; a storage heating pipe arranged within the storage heating portion; a water inlet component in communication with a bottom of the hot water tank; a water intake structure in communication with a pressurized water source and the water inlet component; a hot water outlet pipe connected to a top of the hot water tank.

8 Claims, 7 Drawing Sheets

WATER BOILER WITH DUAL HEATING FUNCTIONALITY

CROSS-REFERENCE TO RELATED APPLICATIONS

The application claims priority to Chinese Patent Application No. 202223148581.2 with a filing date of Nov. 25, 2022. The content of the aforementioned application, including any intervening amendments thereto, is incorporated herein by reference.

FIELD OF THE DISCLOSURE

The present disclosure relates to a water boiler, especially to a water boiler with dual heating functionality.

BACKGROUND OF THE DISCLOSURE

A water boiler, is a water dispensing device designed and developed to fulfill the demand for hot water consumption by a larger number of individuals. It harnesses electrical energy or other fuel sources to convert them into thermal energy for the production of boiling water. The water boiler finds extensive application in various public settings such as corporate establishments, hotels, military units, stations, airports, and hospitals, owing to its user-friendly nature, affordability, compact size, and aesthetic appeal. With the increasing adoption of water boilers, people's expectations and requirements for these devices have escalated.

Currently, water boilers can be categorized into two main technological approaches: the storage water boiler and the instantaneous water boiler. The storage water boiler involves heating water within a tank and dispensing the preheated boiling water directly when needed. On the other hand, the instantaneous water boiler rapidly heats cold water as it flows through the device, providing immediate access to hot water.

Among these, the storage water boiler boasts a greater water flow rate as its advantage, but it lacks the ability to adjust the water temperature promptly. In contrast, the instantaneous water boiler offers the advantage of instantaneous temperature adjustment, yet it suffers from limitations in power, resulting in a significantly reduced flow rate. Consequently, neither of the aforementioned water boilers can meet the demands of users requiring a substantial amount of hot water within a short timeframe.

Hence, the object of the present disclosure is to provide a low-power, high-flow water boiler that allows for instantaneous temperature adjustment of the dispensed water.

SUMMARY OF THE DISCLOSURE

The present disclosure provides a water boiler with dual heating functionality for addressing the aforementioned problems.

The water boiler with dual heating functionality includes:
a hot water tank having an upper section and a lower section; the upper section is narrower than the lower section; the hot water tank comprises an instantaneous heating portion, and a storage heating section;
an instantaneous heating pipe arranged within the instantaneous heating portion;
a storage heating pipe arranged within the storage heating portion;
a water inlet component in communication with a bottom of the hot water tank;
a water intake structure in communication with a pressurized water source and the water inlet component;
a hot water outlet pipe connected to a top of the hot water tank.

In some embodiments, the hot water tank includes an instantaneous heating chamber, and a storage heating chamber located under and in communication with the instantaneous heating chamber; the diameter of the storage heating chamber is greater than the diameter of the instantaneous heating chamber.

In some embodiments, the water intake structure includes a water intake pipe in communication with the pressurized water source, a purified water outlet pipe in communication with the water intake pipe, a water outlet pipe in communication with the water inlet component; the water outlet pipe is connected to an expansion tank.

In some embodiments, the water intake structure further includes a return pipe that connects to the hot water outlet pipe.

In some embodiments, the water inlet component includes a water inlet pipe anchored at the bottom of the storage heating chamber, and a secure nut; wherein an outer surface of the water inlet pipe is threaded; the secure nut is attached to the outer surface of the water inlet pipe by thread connection; a nut bottom of the secure nut is supported by an inner bottom surface of an external body of the hot water tank.

In some embodiments, a top of the water inlet pipe is sealed, and a plurality of inlet holes are arranged on an external surface of the water inlet pipe.

In some embodiments, the water inlet component further includes a inlet pipe fixture attached to an inner surface of the water inlet pipe by means of thread connection, and an inlet plug inserted into one side of the inlet pipe fixture and in communication with the water outlet pipe.

In some embodiments, a temperature sensor is arranged in a top of the instantaneous heating chamber.

The advantages of the present disclosure is as follows.

By incorporating a hot water tank with a narrow upper section and a wider lower section, this disclosure achieves dual heating functionality within one single water boiler. Firstly, the water is heated to a warm temperature in the storage heating chamber by the storage heating pipe. This stage is suitable for most water applications. However, when users require a significant amount of hot water, the instantaneous heating pipe rapidly heats the warm water as it flows through the hot water outlet pipe. This enables users to obtain a substantial volume of water at their desired temperature within a short period, providing versatility within one single device. Compared to existing approaches that involve series or parallel connection of two separate water tanks, this water boiler with dual heating functionality significantly reduces costs, enhances user experience, and lowers the overall purchasing expenses. The water boiler serves a dual purpose while ensuring efficient performance and satisfying user demands.

BRIEF DESCRIPTION OF DRAWINGS

In order to illustrate the technical solutions of the embodiments of the present invention more clearly, the accompanying drawings used in the embodiments will be briefly introduced below. It should be understood that the following drawings only show some embodiments of the present invention, and therefore should not be regarded as a limi

DETAILED DESCRIPTION OF THE DISCLOSURE

Figure 1:
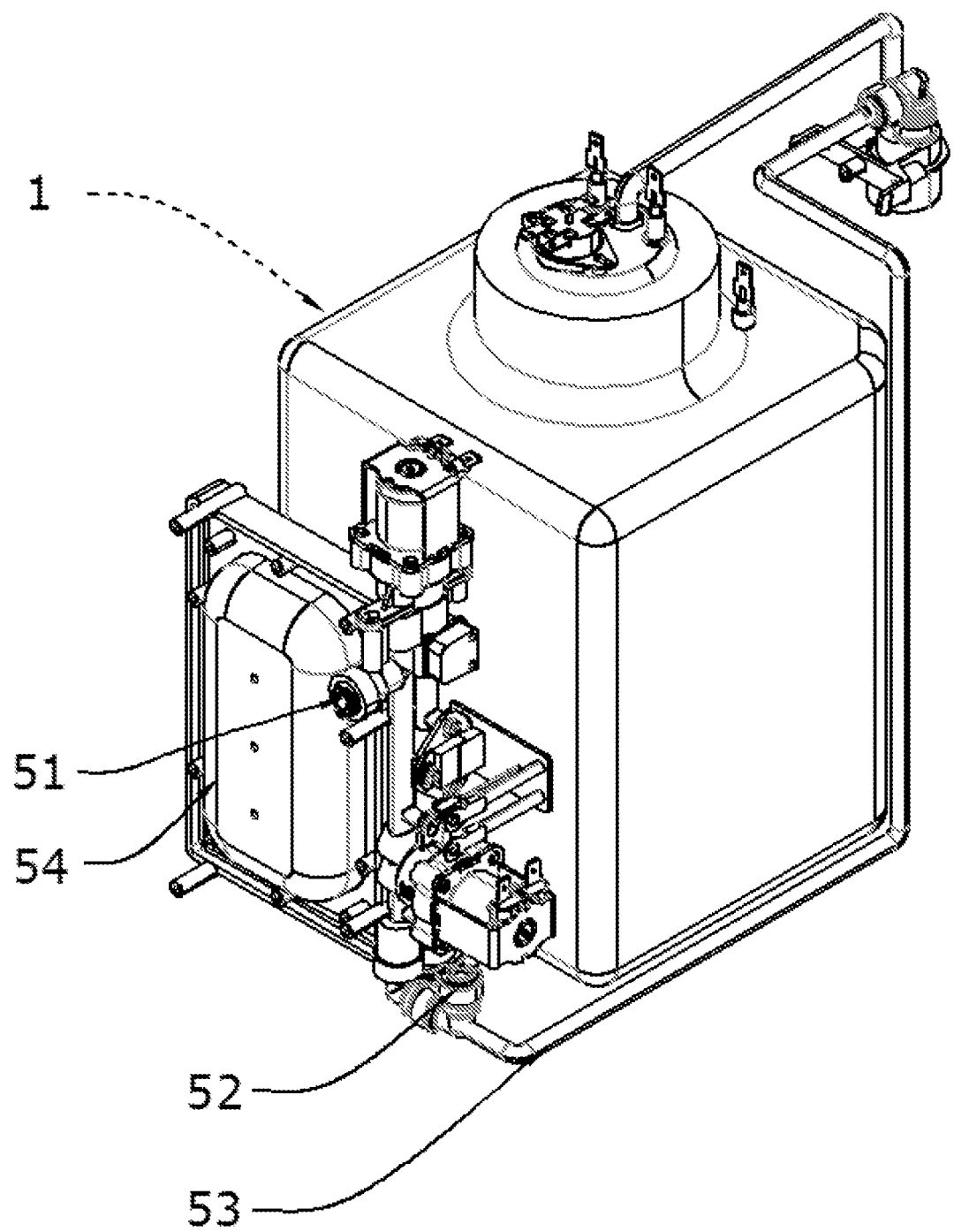
- FIG. 1 is schematic diagram of the water boiler with dual heating functionality in a first view according to embodiments of the present disclosure.
Figure 2:
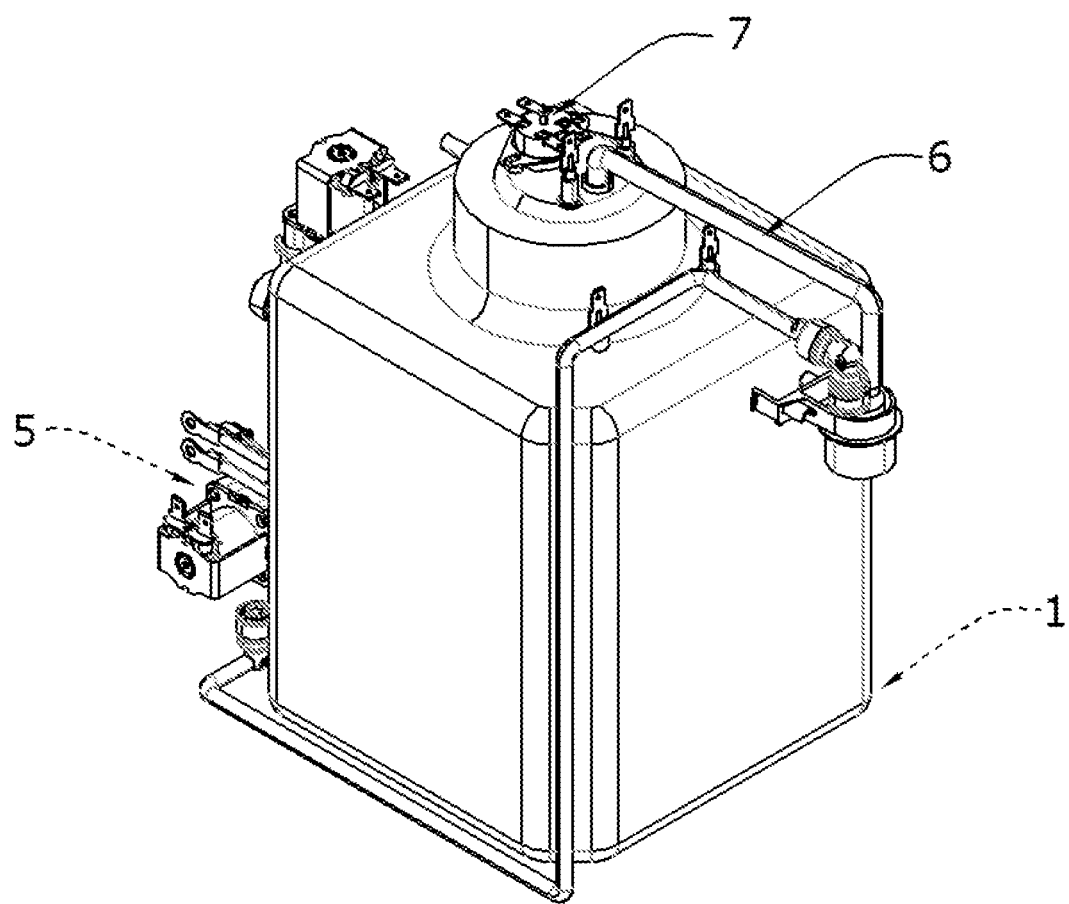
FIG. 2 is a schematic diagram of the water boiler with dual heating functionality in a second view according to embodiments of the present disclosure.
Figure 3:
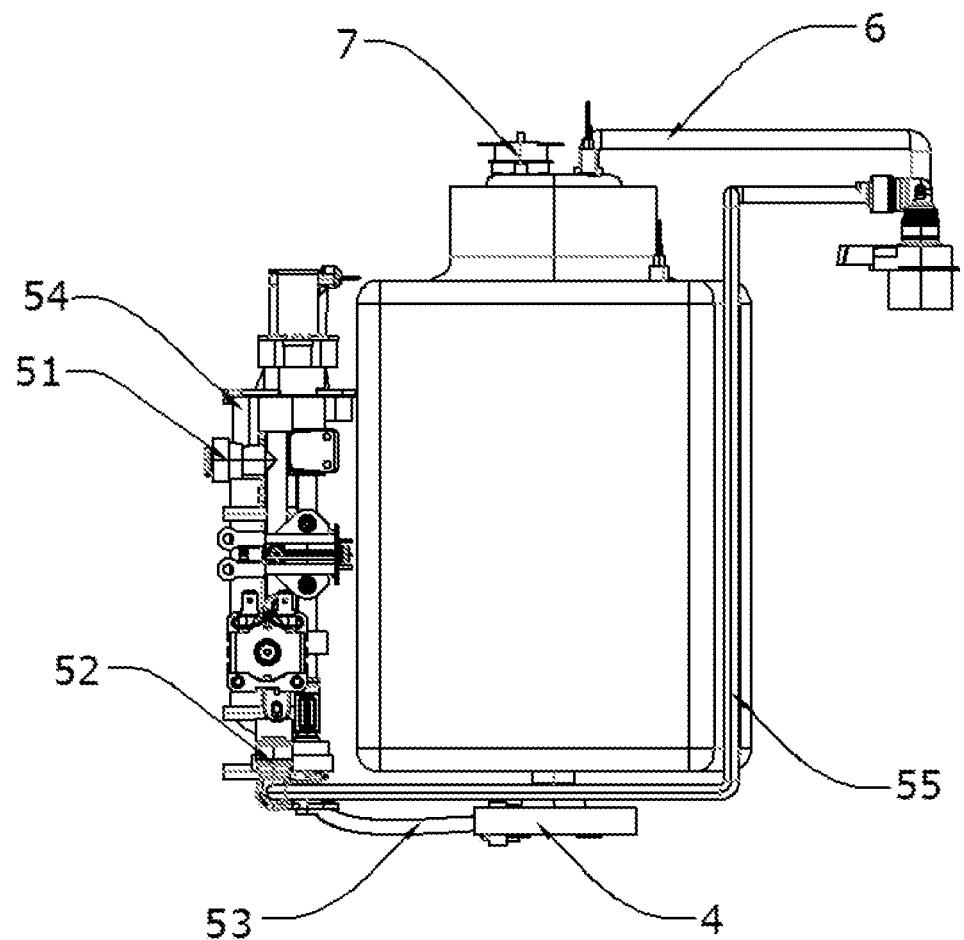
FIG. 3 is a front-viewed diagram of the water boiler with dual heating functionality according to embodiments of the present disclosure.
Figure 4:
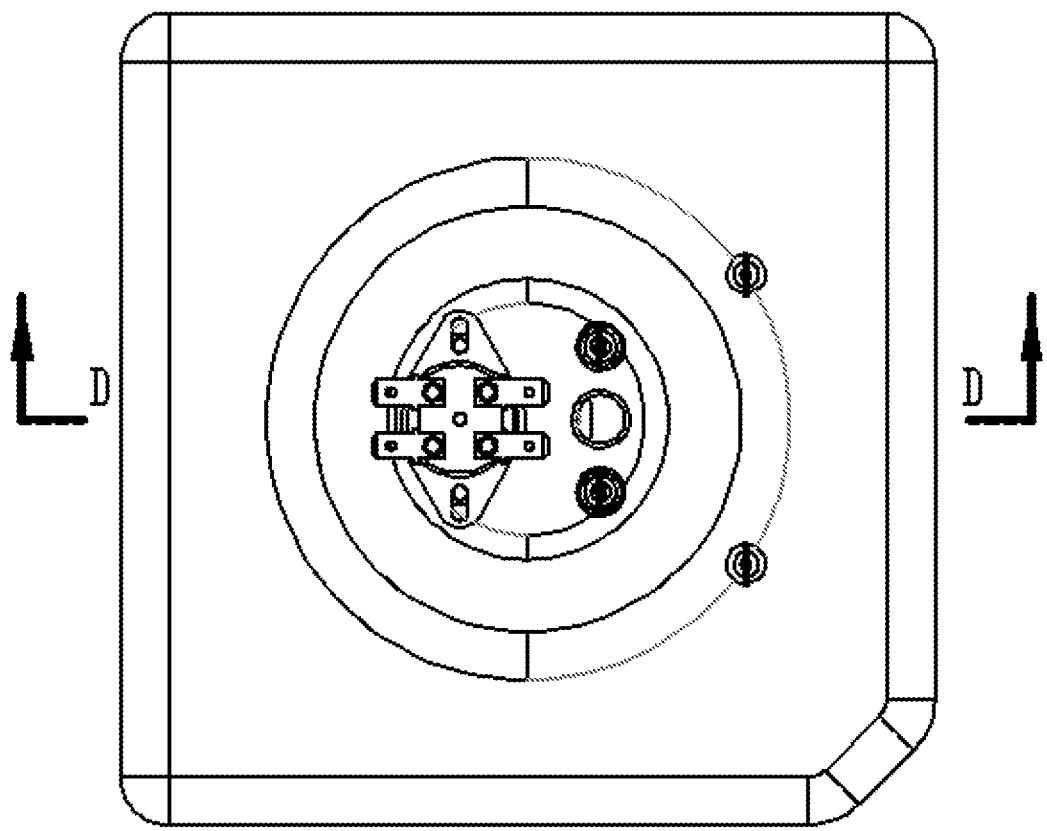
FIG. 4 is a top-viewed diagram of the water boiler with dual heating functionality according to embodiments of the present disclosure.

For the implementation of the present invention, all belong to the protection scope of the present invention. Accordingly, the following detailed description of the embodiments of the invention provided in the accompanying drawings is not intended to limit the scope of the claimed invention, but merely represents selected embodiments of the invention. Based on the implementation manners in the present invention, all other implementation manners obtained by persons of ordinary skill in the art without creative efforts fall within the protection scope of the present invention.

In the description of the present invention, the terms "first" and "second" are only used for the purpose of description, and cannot be understood as referring to the purpose, technical solution and advantages of the method to be clearer. The following will be combined with the accompanying drawings in the embodiment of the present invention, clearly and completely describe the technical solutions in the embodiments of the present invention, obviously, the described embodiments are part of the embodiments of the present invention, but not all of them. Based on the embodiments in the present invention, all other embodiments obtained by persons of ordinary skill in the art without creative work show or imply relative importance or implicitly indicate the quantity of the indicated technical features. Thus, a feature defined as "first" and "second" may explicitly or implicitly include one or more of these features. In the description of the present invention, "a plurality of" means two or more, unless otherwise specifically defined.

In existing water boilers, there are typically two types: storage water boilers and instantaneous water boilers. Even in cases where attempts have been made to combine the functionalities of both, it usually involves connecting them through pipelines. When there is a need for quickly producing a large volume of hot water while also being able to adjust it to the desired temperature, it requires the use of two separate water tanks, along with the connecting pipelines, electromagnetic valves for controlling the flow, and electronic control structures for regulating the system. Consequently, the cost and selling price of such water boilers increase. Although users can acquire a water heater that meets their requirements, they have to pay more. To address these technical challenges, the following technical solution is proposed in this disclosure.

Referring to FIGS. 1-7, a water boiler with dual heating functionality includes a hot water tank 1 having an upper section and a lower section. The upper section is narrower than the lower section; the hot water tank comprises an instantaneous heating portion, and a storage heating section. The water boiler further includes an instantaneous heating pipe 2 arranged within the instantaneous heating portion, a storage heating pipe 3 arranged within the storage heating portion, a water inlet component 4 in communication with a bottom of the hot water tank 1, a water intake structure 5 in communication with a pressurized water source and the water inlet component 4, and a hot water outlet pipe 6 connected to a top of the hot water tank 1. As shown in FIGS. 1-7, it is evident that the instantaneous heating pipe 2 is solely located within the instantaneous heating portion, while the storage heating pipe 3 extends to the bottom of the hot water tank 1. This means that the instantaneous heating pipe 2 heats only the water at the outlet, while the storage heating pipe 3 is responsible for heating the entire water volume inside the hot water tank 1.

During the non-usage phase, the water boiler operates as follows: Firstly, an external pressurized water or municipal water is connected and introduced to the water inlet component 4 through the water intake structure 5, ensuring that the hot water tank 1 is filled with water. Next, the storage heating pipe 3 is activated to heat the water inside the hot water tank 1. At this stage, the heating temperature of the storage heating pipe 3 can be set according to the user's needs. For example, if the user intends to make coffee, water at 80° C. is required. Therefore, the storage heating pipe 3 can heat the water inside the tank to 80° C., while the instantaneous heating tube 2 remains inactive. Consequently, the water pumped out through the hot water outlet pipe 6 by a pump will be at 80° C.

However, in situations where the user requires boiling water for making tea or sterilization purposes, water at 100° C. is needed. Since the water temperature inside the hot water tank 1 is already at 80° C., the instantaneous heating pipe 2 can be activated. By starting the pump at the hot water outlet pipe 6, the water passing through the hot water outlet pipe 6 will be heated to 100° C. by the instantaneous heating pipe 2. As the water temperature is already at 80° C., it can be rapidly heated to 100° ° C. by the instantaneous heating pipe 2. Consequently, a substantial volume of water at 80° C. can be quickly converted into hot water at 100° C., enabling users to obtain a large quantity of boiling water within a short period. Furthermore, the instantaneous heating pipe 2 can be set to precise temperatures such as 95° C. or 96° C. Therefore, through the segmented design of the instantaneous heating pipe 2 and the storage heating pipe 3, three types of water can be obtained: a large quantity of boiling water, a large quantity of warm water, and a large quantity of water at the desired temperature specified by the user. This design accommodates multiple customer needs within one single water tank, thereby reducing the overall cost of the water boiler.

Figure 5:
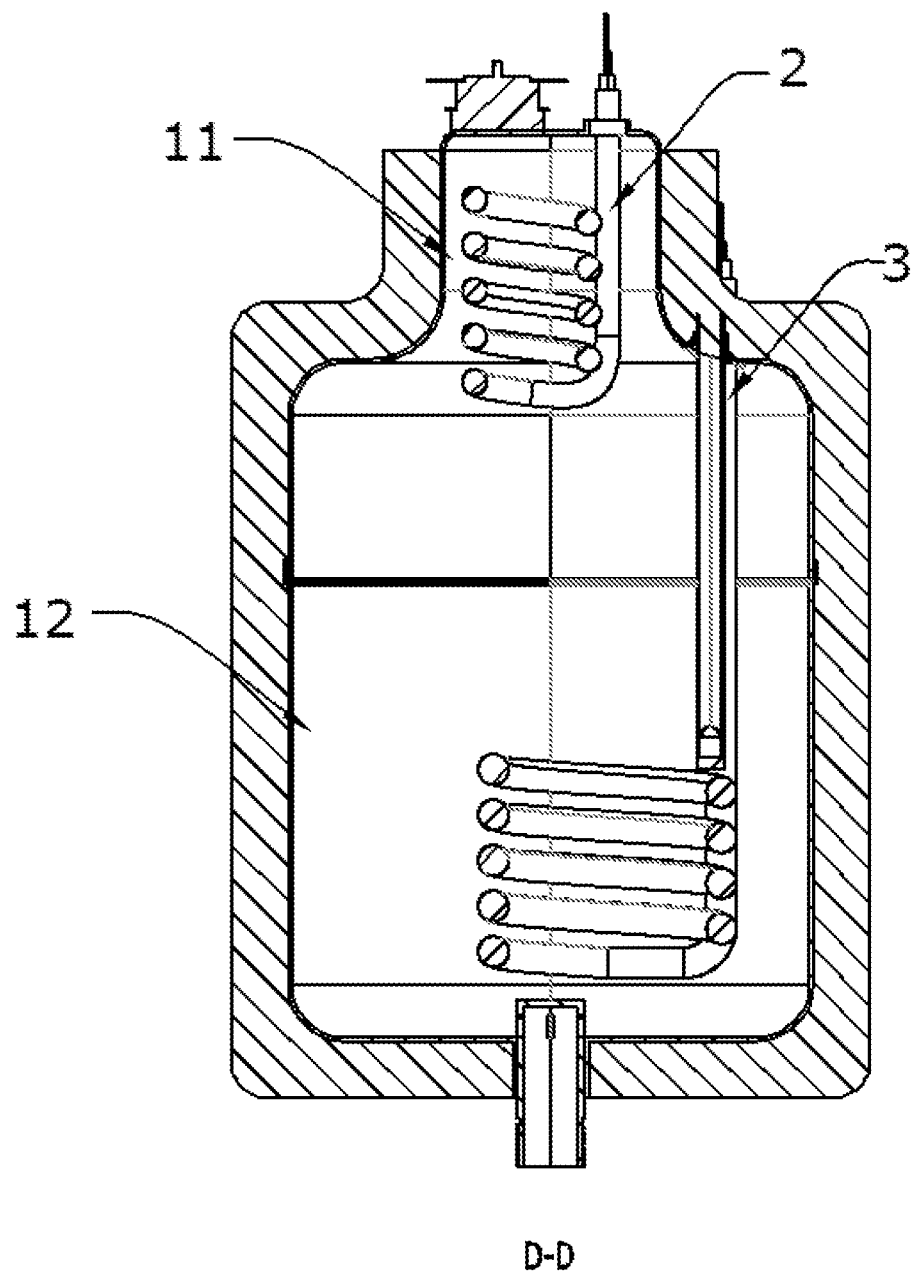
FIG. 5 is a cross-sectional view from D-D in FIG. 4.
Figure 6:
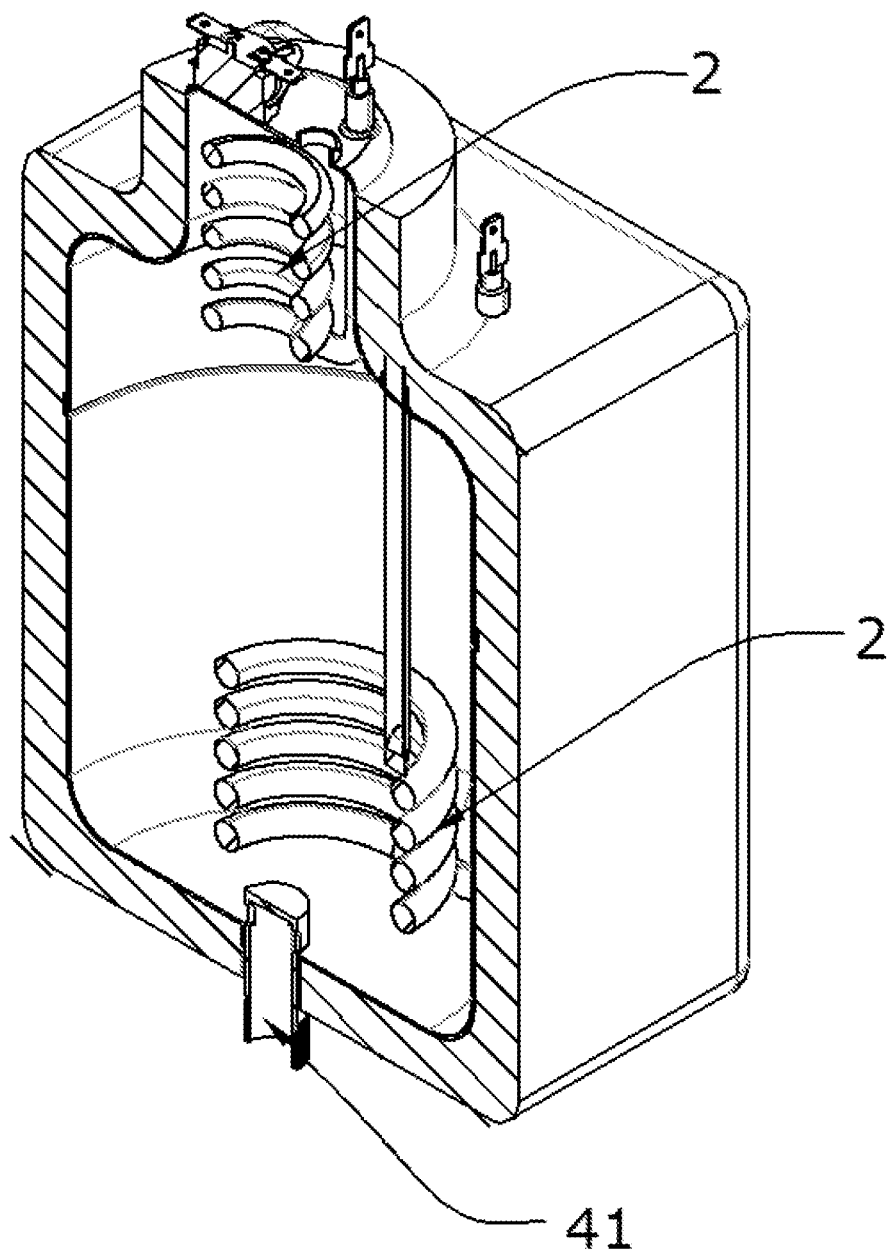
FIG. 6 is a perspective elevational view of FIG. 5.
Figure 7:
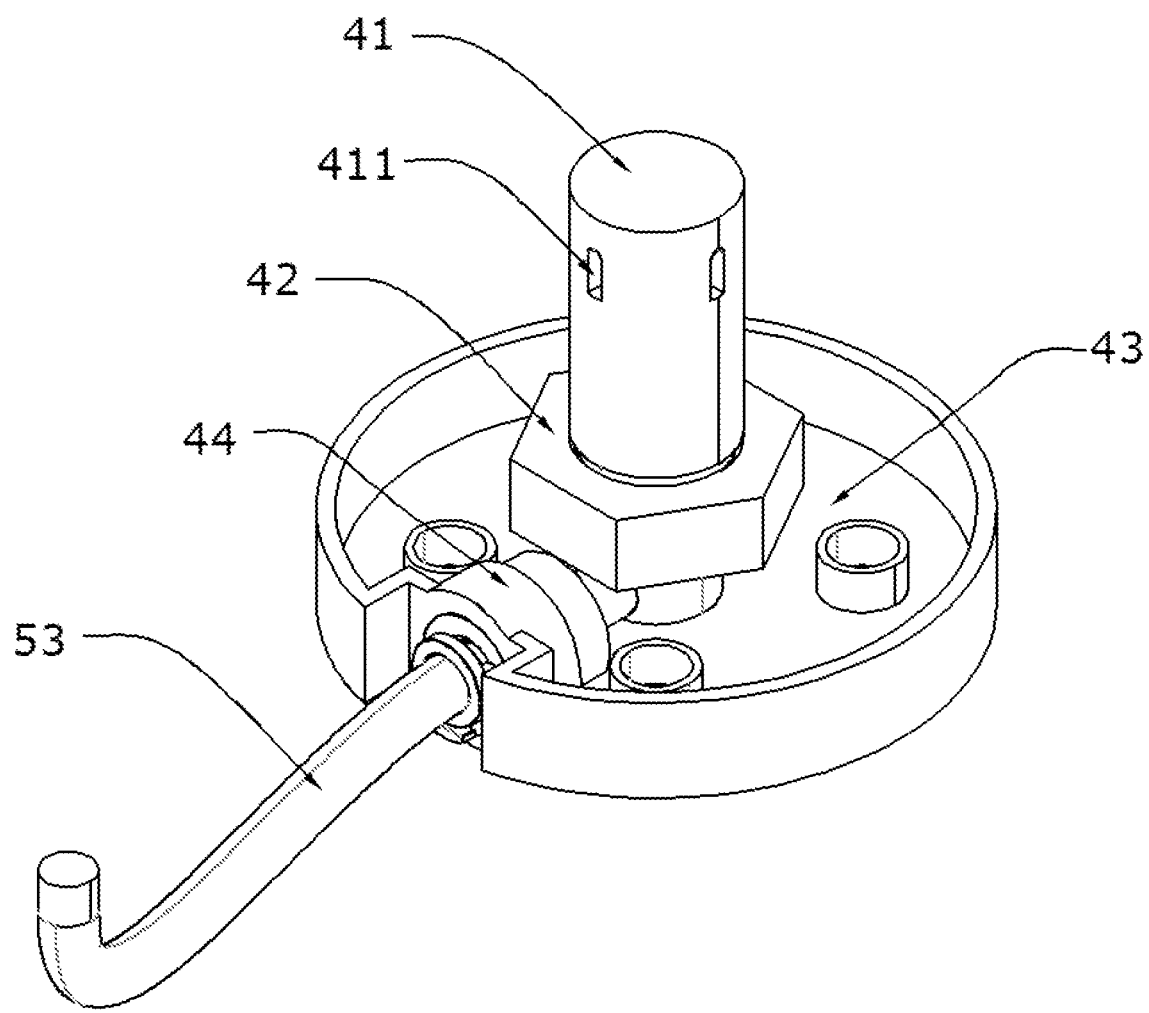
FIG. 7 is a perspective schematic diagram of a water inlet component according to embodiments of the present disclosure.

From FIG. 5, it is evident that the hot water tank 1 includes an instantaneous heating chamber 11, and a storage heating chamber 12 positioned under the instantaneous heating chamber 11. The storage heating chamber 12 has a larger diameter compared to the instantaneous heating chamber 11. The instantaneous heating chamber 11, located at one end of the hot water outlet pipe 6, can be adjusted according to customer requirements prior to water discharge. If the instantaneous heating chamber 11 were spacious, the instantaneous heating pipe 2 would be incapable of rapidly heating the water to the desired temperature during water discharge. Consequently, the instantaneous heating chamber 11 is designed with a smaller diameter, while the storage heating chamber 12 serves as a preparatory cavity and necessitates a larger water storage capacity.

However, in this embodiment, the water boiler not only produces hot water but also functions as a water purifier. Therefore, during the water inlet process, apart from the pipeline leading to the hot water tank 1, the water intake structure 5 includes a water inlet pipe 51 connected to and in fluid communication with a pressurized water source, and a purified water outlet pipe 52 connected to and in fluid communication with water inlet pipe 51. The purified water can be obtained through the purified water outlet pipe 52 by incorporating a filtering element between the water inlet pipe 51 and the purified water outlet pipe 52. The filtration approaches using a filtering element is a well-known technique in prior art, and therefore the specific structure of the filtering element will not be repeated here. Furthermore, there is a water outlet pipe 53 that connects and fluidly communicates with the water intake structure 5 and the water inlet component 4. After the water in the hot water tank 1 is heated, steam is generated. To prevent deformation of the hot water tank 1, the water formed by the steam is collected through an expansion tank 54 connected to and in fluid communication with the water outlet pipe 53, thereby protecting the hot water tank 1. For detailed information about the operational principles of the hot water tank 1, one may refer to BaiduPedia, and it will not be repeated here.

In the aforementioned context, for instance, when the water in the storage heating chamber 12 is at 80° C. and the user requires water at 90° C., it can be heated using the instantaneous heating pipe 2 just before dispensing. However, if the user intends to prepare infant formula, which requires water at only 70° C., directly dispensing water from the storage heating chamber 12 would be excessively hot and clearly not aligned with the user's needs. Hence, the water intake structure 5 includes a return pipe 55 connected to and in fluid communication with the hot water outlet pipe 6 of the hot water tank 1. Room temperature water flowing into the water inlet pipe 51 is directly introduced into the hot water outlet pipe 6, while water from the storage heating chamber 12 is dispensed through the hot water outlet pipe 6 when the instantaneous heating pipe 2 is not active. This allows for the proportional mixing of 80° C. hot water with room temperature water, achieved by incorporating a thermostatic valve before the pump. The principles of the thermostatic valve can be found on Baidu Pedia. In essence, the thermostatic valve enables the blending of 95% water from the storage heating chamber 12 with 5% room temperature water from the return pipe 55, resulting in water at 70° C. Through the design of the mixed water from the return pipe 55, the hot water tank 1 is capable of rapidly and abundantly dispensing water at the same temperature as the storage heating pipe 3, water at higher temperature than the storage heating pipe 3, or water at lower temperature than the storage heating pipe 3, thereby achieving comprehensive temperature coverage for the water output.

In conventional water heaters, during initial installation or when cleaning the inner tank, it is often necessary to drain all the water by releasing it from the bottom. Therefore, existing water tanks typically have a T-junction installed at the bottom, where one outlet connects to the tank, another connects to the water inlet pipe, and the final outlet faces towards the tank. The water inside the tank is drained through this final outlet. Moreover, during regular use of the water tank, to prevent any downward leakage from the final outlet, it is necessary to seal the end facing the ground with a plug, ensuring no side leakage occurs during water inflow and heating processes. Additionally, to secure the water tank in place, a fixture such as a fixing fixture is installed at the bottom of the plug. However, the design of the T-junction, plug, and fixture in the external shell of the water tank increases its overall height. Consequently, when drainage is required, the fixture and plug must be removed, making the drainage process cumbersome. Such design also complicates the structure of the water tank's inlet, resulting in reduced practicality.

In this embodiment of the present disclosure, the entire water boiler is housed within an external shell. However, in other embodiments, it is also possible to directly install the water boiler in locations such as kitchen cabinets or beneath the sink, without the need for an external shell.

Therefore, in contrast to the aforementioned issue, this embodiment introduces a simple structure. Specifically, the inlet component 4 includes a water inlet pipe 41 that is securely attached to the bottom of the storage heating chamber 12. The outer surface of the water inlet pipe 41 is threaded. A secure nut 42 is threaded onto the outer surface of the water inlet pipe 41, and the bottom of the secure nut 42 is supported on the inner bottom surface of the external shell of the water boiler. Initially, it is still necessary to follow the conventional setup by connecting the water inlet pipe 41 to allow external water to flow into the water boiler. However, in this case, the structure that fixes the hot water tank 1 within the entire water boiler is the secure nut 42. By connecting the secure nut 42 to the water inlet pipe 41, the entire hot water tank 1 can be securely supported, and the hexagonal shape of the secure nut 42 provides a flat surface at the bottom, allowing the hot water tank 1 to be fixed inside the external shell.

After addressing the issue of supporting and fixing the hot water tank 1, it is necessary to balance the water inlet and water outlet. In this embodiment, the inlet component 4 also includes an inlet pipe fixture 43 that is threaded onto the inner surface of the water inlet pipe 41, and an inlet plug 44 that is inserted into one side of the inlet pipe fixture 43 and fluidly communicates with the water outlet pipe 53. The inlet pipe fixture 43 is connected to the inner side of the water inlet pipe 41 through threads, serving to secure the entire external shell to an installation surface. When drainage is required, simply removing the inlet plug 44 from the inlet pipe fixture 43 allows for water leakage. When water inlet is needed, reconnecting the inlet plug 44 to the inlet pipe fixture 43 enables water inflow. This process of switching between drainage and water inlet is quick and convenient, and the fixation of the hot water tank 1 and the water boiler can be achieved through a relatively simple structure.

To ensure thorough drainage during water leakage, the top of the water inlet pipe 41 is sealed, and a plurality of inlet holes 411 are provided on the outer surface of the water inlet pipe 41 to allow water to leak out from the sides. This ensures that all the water in the hot water tank 1 can be completely drained. If the leakage occurs from the top opening, there may be some residual water at the bottom of the hot water tank 1.

Since only one water tank 1 is used in this design, a temperature sensor 7 is installed at the top of the instantaneous heating chamber 11 for temperature monitoring. With a single temperature sensor 7, various water inlet processes can be monitored, which reduces costs compared to a design with two water tanks.

The control components such as water sensors and control boards are commonly known in water tanks and water boilers, and their principles of operation are well-established, so it will not be repeated here.

The above descriptions are only preferred embodiments of the present invention, and are not intended to limit the present invention. For those skilled in the art, the present invention may have various modifications and changes. Any modifications, equivalent replacements, improvements, etc. made within the spirit and principles of the present invention shall be included within the protection scope of the present invention.

What is claimed is:

1. A water boiler with dual heating functionality, comprising:
   a hot water tank having an upper section and a lower section; the upper section is narrower than the lower section; the hot water tank comprises an instantaneous heating portion, and a storage heating section;
   an instantaneous heating pipe arranged within the instantaneous heating portion;
   a storage heating pipe arranged within the storage heating portion;
   a water inlet component in communication with a bottom of the hot water tank;
   a water intake structure in communication with a pressurized water source and the water inlet component; and
   a hot water outlet pipe connected to a top of the hot water tank.

2. The water boiler according to claim 1, wherein the hot water tank includes an instantaneous heating chamber, and a storage heating chamber located under and in communication with the instantaneous heating chamber; the diameter of the storage heating chamber is greater than the diameter of the instantaneous heating chamber.

3. The water boiler according to claim 2, wherein the water intake structure includes a water intake pipe in communication with the pressurized water source, a purified water outlet pipe in communication with the water intake pipe, a water outlet pipe in communication with the water inlet component; the water outlet pipe is connected to an expansion tank.

4. The water boiler according to claim 3, wherein the water intake structure further includes a return pipe that connects to the hot water outlet pipe.

5. The water boiler according to claim 3, wherein the water inlet component includes a water inlet pipe anchored at the bottom of the storage heating chamber, and a secure nut; wherein an outer surface of the water inlet pipe is threaded; the secure nut is attached to the outer surface of the water inlet pipe by thread connection; a nut bottom of the secure nut is supported by an inner bottom surface of an external body of the hot water tank.

6. The water boiler according to claim 5, wherein a top of the water inlet pipe is sealed, and a plurality of inlet holes are arranged on an external surface of the water inlet pipe.

7. The water boiler according to claim 5, wherein that the water inlet component further includes a inlet pipe fixture attached to an inner surface of the water inlet pipe by means of thread connection, and an inlet plug inserted into one side of the inlet pipe fixture and in communication with the water outlet pipe.

8. The water boiler according to claim 2, wherein a temperature sensor is arranged in a top of the instantaneous heating chamber.

* * * * *